(12) United States Patent
Muras

(10) Patent No.: US 8,024,321 B2
(45) Date of Patent: Sep. 20, 2011

(54) DYNAMIC LOOK AHEAD PREDICATE GENERATION

(75) Inventor: Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/926,927

(22) Filed: Oct. 29, 2007

(65) Prior Publication Data

US 2008/0052282 A1 Feb. 28, 2008

Related U.S. Application Data

(62) Division of application No. 11/089,469, filed on Mar. 24, 2005, now Pat. No. 7,536,380.

(51) Int. Cl.
G06F 7/00 (2006.01)
G06F 17/30 (2006.01)
(52) U.S. Cl. ........................................ 707/713; 707/718
(58) Field of Classification Search .................. 707/713, 707/718, 721
See application file for complete search history.

(56) References Cited

U.S. PATENT DOCUMENTS

| | | | |
|---|---|---|---|
| 5,544,355 A * | 8/1996 | Chaudhuri et al. | 1/1 |
| 5,903,893 A | 5/1999 | Kleewein et al. | |
| 6,285,997 B1 * | 9/2001 | Carey et al. | 1/1 |
| 6,457,020 B1 * | 9/2002 | Carey et al. | 1/1 |
| 6,460,043 B1 | 10/2002 | Tabbara et al. | |
| 6,513,028 B1 | 1/2003 | Lee et al. | |
| 6,601,062 B1 * | 7/2003 | Deshpande et al. | 1/1 |
| 6,665,678 B2 | 12/2003 | Ching Chen et al. | |
| 6,732,084 B1 | 5/2004 | Kabra et al. | |
| 6,754,653 B2 | 6/2004 | Bonner et al. | |
| 6,763,357 B1 * | 7/2004 | Deshpande et al. | 1/1 |
| 7,051,034 B1 | 5/2006 | Ghosh et al. | |
| 7,103,590 B1 | 9/2006 | Murthy et al. | |
| 7,111,025 B2 | 9/2006 | Finlay et al. | |
| 7,127,456 B1 | 10/2006 | Brown et al. | |
| 7,281,003 B2 | 10/2007 | Lei et al. | |
| 7,536,380 B2 * | 5/2009 | Muras | 1/1 |
| 2001/0049685 A1 * | 12/2001 | Carey et al. | 707/103 R |
| 2005/0131877 A1 * | 6/2005 | Ghosh et al. | 707/3 |
| 2005/0289160 A1 | 12/2005 | Ashwin et al. | |
| 2006/0026154 A1 * | 2/2006 | Altinel et al. | 707/5 |

OTHER PUBLICATIONS

Arthur M. Keller, A Predicate Based Caching Scheme for Client server database architectures, The VLDB journal, 1996.*

(Continued)

*Primary Examiner* — Hung T Vy
(74) *Attorney, Agent, or Firm* — Wood, Herron & Evans, LLP

(57) ABSTRACT

An apparatus, program product and method that employ a dynamic use of Look Ahead Predicate Generation that will enable the database, database engine, and/or query optimizer to alter the processing of a query, and react to sub-optimal access plan selection and additional factors arising after processing has begun, to heal many poor performing queries. Conventional use of LPG requires the query optimizer to decide whether or not to use LPG before the processing of a query begins. As a result, the query optimizer may not only make sub-optimal decisions, but the query optimizer may not consider additional factors that may arise as the query is processing. However, the dynamic use of LPG allows predicates to be built after processing of the query has started and the ability to alter the query's processing to improve query performance.

15 Claims, 2 Drawing Sheets

OTHER PUBLICATIONS

U.S. Patent and Trademark Office, Office Action issued in related U.S. Appl. No. 11/089,469, dated Aug. 14, 2007.
U.S. Patent and Trademark Office, Final Office Action issued in related U.S. Appl. No. 11/089,469, dated Feb. 6, 2008.
U.S. Patent and Trademark Office, Final Office Action issued in related U.S. Appl. No. 11/089,469, dated Mar. 19, 2008.
U.S. Patent and Trademark Office, Notice of Allowance issued in related U.S. Appl. No. 11/089,469, dated Jan. 15, 2009.

* cited by examiner

DYNAMIC LOOK AHEAD PREDICATE GENERATION

CROSS-REFERENCE TO RELATED APPLICATIONS

This application is a divisional of U.S. patent application Ser. No. 11/089,469 filed on Mar. 24, 2005 by Brian Robert Muras, the entire disclosure of which is incorporated by reference herein.

FIELD OF THE INVENTION

The invention relates to database management systems, and in particular, to the optimization of queries with Look Ahead Predicate Generation by database management systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan. The access plan may include the use of Look Ahead Predicate Generation (LPG). LPG is a technology used in the iSeries DB2 from International Business Machines Corporation whereby local selection is generated on one table by obtaining the values of columns it joins to on other tables. Typically, the optimizer determines whether LPG should be used or not before it starts to fetch rows for the query. Once the optimizer determines that LPG will be used, the predicates are generated or built, and the entire query is typically processed with the predicates. LPG is typically used on clearly complex queries, since the costs (e.g., time and resources) of processing a complex query without predicates are higher than the costs associated with generating the predicates and then processing the complex query using the predicates. The performance of long running complex join queries, for example, is greatly enhanced through the use of LPG. Contrarily, LPG is not used on clearly simple queries, since the costs of processing a simple query without predicates are lower than the costs associated with generating the predicates and processing the simple query using the predicates.

Typically, however, for the majority of queries received by the optimizer, it is not precisely clear whether or not the query would benefit from the use of LPG. The lack of clarity by the optimizer may be due to files being dynamically updated as the query is simultaneously processing, statistical imprecision during optimization, or contention for system resources. The lack of clarity may lead to poor decision making by the optimizer and a decline in performance as queries that would benefit from LPG, such as a query that becomes complex during processing due to a large dynamic upload, may be processed without LPG. Moreover, the lack of clarity may lead the optimizer to needlessly decide to process a query using LPG even though the query may not benefit from LPG, thus, increasing the query's processing time instead of shortening the processing time.

One cause of such poor decision making is due to the fact that the optimizer typically makes its determination of whether or not to use LPG before initiating processing of the query. Therefore, any additional factors that may arise after processing of the query begins are never considered when deciding whether or not LPG should be used.

A need therefore exists in the art for improving the performance of database queries, and in particular, for a more flexible and intelligent approach for utilizing LPG in connection with processing database queries.

SUMMARY OF THE INVENTION

The invention addresses these and other problems associated with the prior art by providing an apparatus, program product and method that dynamically uses Look Ahead Predicate Generation (dynamic LPG) after a database query has begun processing. Typically, dynamic LPG will enable a query optimizer to alter the processing of a database query after processing has begun to better optimize query performance, e.g., to react to sub-optimal access plans and additional factors affecting the query's processing.

For example, certain embodiments consistent with the invention may perform LPG for a database query after the query has begun processing and use the LPG predicates to fetch at least one additional record from the database by the database query. Furthermore, LPG information can be stored, updated, and retrieved from a cached access plan for the database query to enable the query optimizer to more efficiently determine when to use LPG for the database query, resulting in improved query performance.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
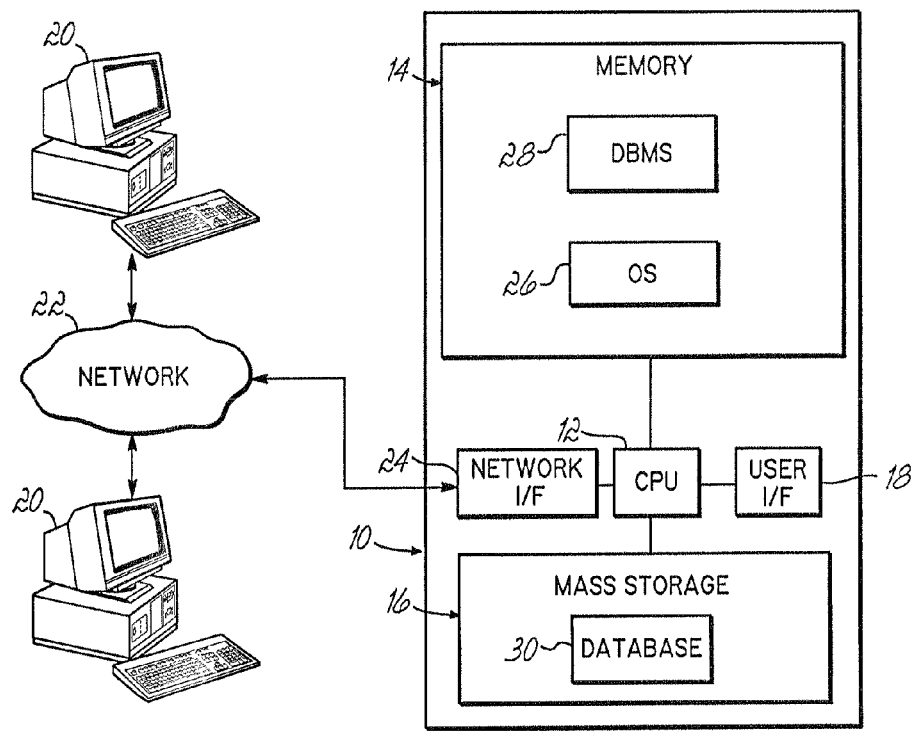
FIG. 1 is a block diagram of a networked computer system incorporating a database management system within which is implemented query optimization consistent with the invention.

The embodiments discussed hereinafter illustrate the dynamic use of Look Ahead Predicate Generation (dynamic LPG) after a query has begun processing to improve the query's performance. Embodiments consistent with the invention may have applicability with practically any type of query that may benefit from LPG.

Dynamic LPG can generate or build at least one predicate at least one time throughout the processing of the database query. Dynamic LPG may also generate one or more than one predicate at the same time. The query optimizer may determine when an additional predicate may be used.

Dynamic LPG may be implemented in a number of manners consistent with the invention. For example, one or multiple predicates can be generated based upon whether a threshold has expired. A threshold consistent with this invention may be represented using a number of different metrics, e.g., an input/output cost, a comparison of input/output costs, processing cost, a comparison of processing costs, a time frame, a sliding scale value, a system resource, etc. The threshold may be an exact value such as zero, an estimate, and/or a percentage. The threshold may involve a calculation. For example, the calculation may involve comparing the percentage of actual processing time used to an estimated time and determining if the actual processing time used is a threshold percentage worse than the estimated time. The threshold may also be global to the whole database query or the threshold may be isolated to at least one portion of the database query. Additionally, more than one threshold may also exist for the database query. When multiple thresholds exist, the query optimizer may determine which specific predicate or predicates will be generated by which threshold. For example, the query optimizer may prioritize between multiple predicates based on selectivity and/or cost to generate the predicates. Moreover, determining which specific predicates may be built can be decided before or after a threshold expires. Thus, determining which specific predicates to generate and the actual generation of the predicates may be done separately. Furthermore, the determination need not be dependent on the threshold and/or the determination can be made more than once consistent with the invention.

Dynamic LPG may also generate at least one predicate in parallel with the processing of the database query, i.e., concurrently with at least one record being fetched from a database by the database query. Thus, dynamic LPG can generate predicates as the database query is being simultaneously processed without predicates. Embodiments consistent with this invention may also use dynamic LPG to generate at least one predicate at the same point in time the database query begins processing. In the alternative, processing of a query may be temporarily suspended while a predicate is being generated.

Additionally, embodiments consistent with the invention may also dynamically terminate the generation of at least one predicate. The same or similar considerations used to generate predicates with dynamic LPG may be used to terminate the generation of at least one predicate while the database query is processing in parallel. For example, a threshold can also be used to terminate LPG. Moreover, if the processing of the database query completes before a predicate is generated by dynamic LPG, there may no longer be a need to continue generating the predicate, and dynamic LPG can be terminated.

Embodiments consistent with this invention may therefore generate and/or terminate generating at least one predicate at any time throughout the database query's processing. Additionally, embodiments consistent with the invention may also improve optimizer performance by storing, updating, and retrieving LPG information from cached query access plans. LPG information consistent with this invention may be any information useful to dynamically initiate and/or terminate dynamic LPG, e.g., an indication that look ahead predicate generation should be performed, an indication that look ahead predicate generation should not be performed, an indication of whether or not performing look ahead predicate generation for the database query improved the processing time for the database query, a result of the look ahead predicate generation, a predicate, a threshold, etc. Therefore, the optimizer can use the cached access plan of a database query in determining whether to use LPG for the database query.

Turning now to the Drawings, wherein like numbers denote like parts throughout the several views, FIG. 1 illustrates an exemplary hardware and software environment for an apparatus 10 suitable for implementing a database management system incorporating query optimization consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
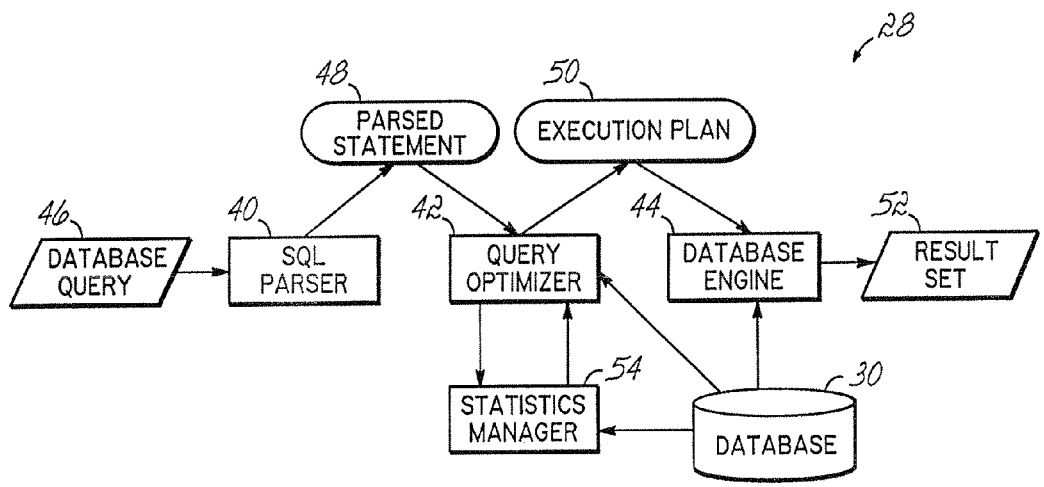
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

To facilitate the optimization of queries, DBMS 28 may also include a statistics manager 54. Statistics manager 54 may be used to gather, create, and analyze statistical information used by the query optimizer 42 to select an access plan. The access plan may or may not include LPG. However, the query optimizer 42 may also create a database query access plan that contains the knowledge that LPG may be dynamically performed at least once throughout the query's processing. The query optimizer 42 may also store, update, and/or retrieve information from the database query's cached access plan. Additionally, the database engine 44 may monitor the performance of the database query's processing and may generate and/or terminate LPG predicates. Database 30 may detect and report changes to any tables in the query to the database engine 44. It will be appreciated by those of ordinary skill in the art, however, that the optimizer 42, database 30, database engine 44 and/or statistics manager 54 may be accorded different functionality to implement dynamic LPG in other embodiments consistent with the invention. Moreover, components may be added and/or omitted in other embodiments consistent with the invention. Those of ordinary skill in the art will also recognize that the exemplary implementation of DBMS 28 illustrated in FIG. 2 is not intended to limit the present invention. Indeed, those skilled in the art will recognize that other alternative hardware and/or software environments may be used without departing from the scope of the invention.

Figure 3:
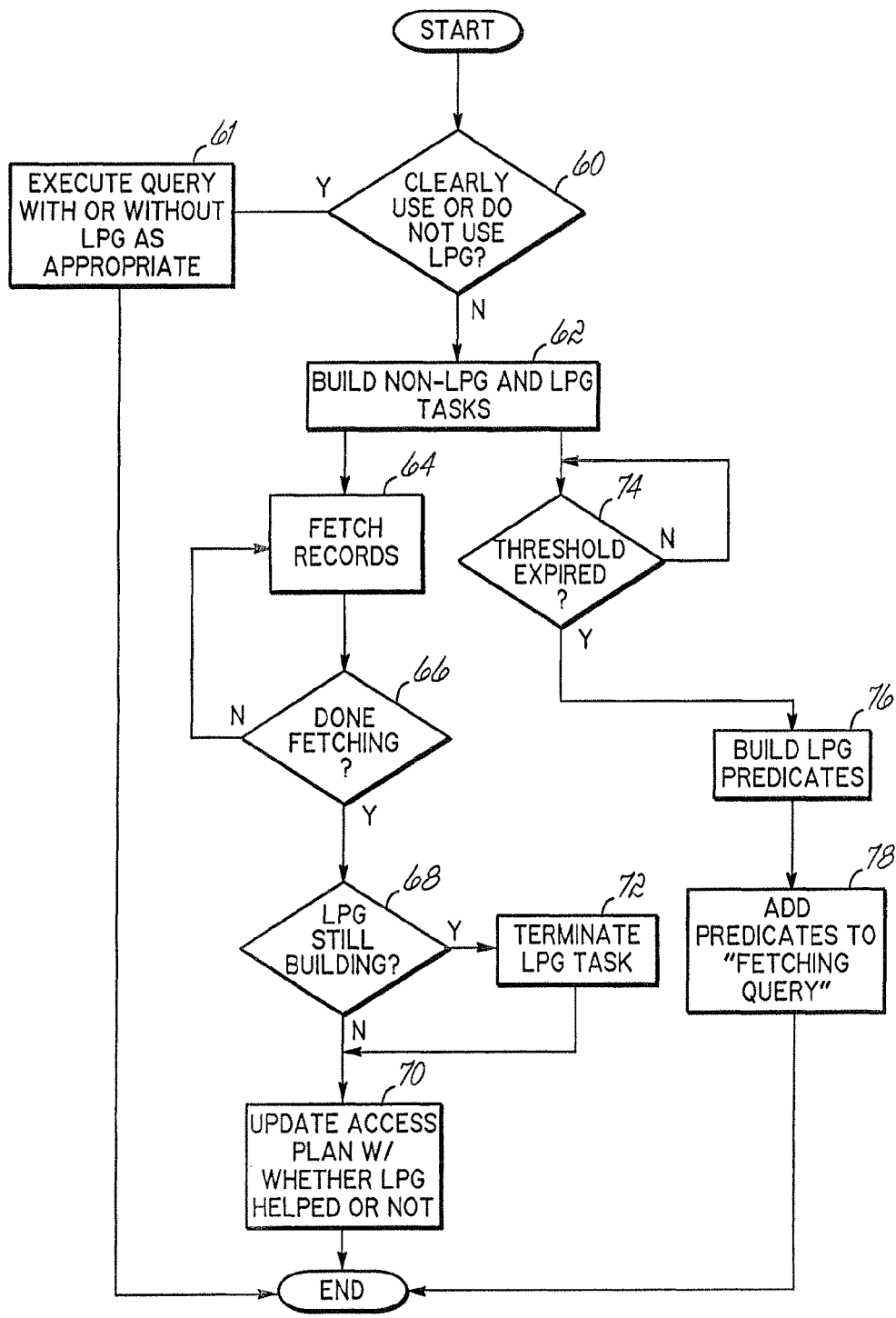
FIG. 3 is a flowchart illustrating the program flow of one implementation of dynamic Look Ahead Predicate Generation.

FIG. 3 illustrates a flowchart of an exemplary method illustrating the dynamic use of Look Ahead Predicate Generation (LPG) in accordance with the principles of the present invention. In block 60, the optimizer determines if LPG should be clearly used or not used to process a given query. LPG should be clearly used when running and/or the estimated cost of running the database query with LPG is much lower than the estimated cost of running the database query without LPG and the statistical confidence for the estimate is very high. LPG should be clearly not used when running and/or the estimated cost of running the database query with LPG is much higher than the estimated cost of running the database query without LPG and the statistical confidence for the estimate is very high. The query optimizer may also determine whether LPG should be clearly used or not by retrieving information from the database query's cached access plan about prior run times. If block 60 determines that LPG clearly should or should not be used, control passes to block 61 to process the query with or without LPG as appropriate, completing this exemplary method. However, if it is unclear whether LPG should be clearly used or not, then control passes to block 62, which initiates both a NON-LPG and a LPG task for the database query. The NON-LPG and LPG tasks run in parallel and respectively pass control to blocks 64 and 74. The parallel tasks allows the processing of a database query to begin without LPG and for predicates to be dynamically generated at least once during the query's processing.

Turning to block 74, the LPG task may dynamically start building at least one predicate when a threshold has expired or been met. A threshold consistent with this invention may be represented using a number of different metrics or indicators not limited to those referenced above. The threshold may be continuously checked until the database query has finished processing. If the threshold has expired, then control passes to block 76 to build LPG predicates. Block 76 may build at least one predicate. The specific predicate or predicates to be built by block 76 may be determined before the threshold in block 74 expires as well as after the threshold expires. Next, the LPG predicate or predicates are added to the fetching query in block 78. The fetching query is the database query which may have been fetching records from the database in the parallel NON-LPG task without any predicates. Embodiments consistent with this invention need not add all the predicates built in block 76 to the fetching query at the same time. After at least one predicate is added, the query can then fetch additional records using the predicates to improve the performance of the query. Those of ordinary skill in the art will appreciate that the threshold and/or predicates can also be stored and/or updated in the query's cached access plan.

Turning to block 64, a record may be fetched without LPG predicates according to the parallel NON-LPG task. Then, in block 66, it is determined if the query has finished fetching all the records meeting the query parameters. If more records need to be fetched by the query, then control returns to block 64 to fetch more records without the use of predicates. However, blocks 64 and 66 may also be used to fetch records using LPG predicates. For example, if LPG predicates were added to the query by the parallel LPG task in block 78, then the query may be fetching and determining records meeting the query parameters in blocks 64 and 66 using at least one LPG predicate.

Nonetheless, when the query is done fetching, it is determined in block 68 if predicates are still being built by the parallel LPG task. Given that the NON-LPG and LPG tasks are running in parallel, determining if LPG is still building in block 68 refers to predicates being generated by the parallel LPG task. If LPG is still building, then control passes to block 72 which terminates the building of any predicates by the parallel LPG task. One of ordinary skill in the art will recognize that if the query has already finished fetching all the records meeting the query parameters in block 66, then the need may no longer exist to continue building predicates to process a query that has already finished. Therefore, unless the LPG task has ended, the LPG task may be terminated in block 72. However, embodiments consistent with this invention may not terminate the LPG task. Instead, for example, an embodiment may continue building predicates already in progress and/or may store and/or update any information (e.g., threshold, partially generated predicates, predicates that have not been added to the fetching query, etc.) relevant to the LPG task in the cached access plan for the database query prior to terminating the LPG task in block 72. Those of ordinary skill in the art will appreciate that although the query may have finished processing before the LPG task completed, this approach may be useful to future queries and also lead to improved query performance and improved decision making by the query optimizer.

Returning to block 68, if the LPG task is not building predicates, then control passes to block 70. If the LPG task is not building, this may mean that the LPG task ended and the predicates were already added to the query. Block 70 updates the cached access plan for the database query with whether or not LPG improved the processing of the query. Those of ordinary skill in the art will appreciate the benefits of updating the query's cached access plan, for example, if the same query needs to be processed, the optimizer can read the cached access plan and clearly determine if LPG should be used before processing begins in block 60. Additionally, other information (e.g., a result of the look ahead predicate generation, a predicate, a threshold, etc.) may also be stored and/or updated in the cached access plan for the database query consistent with the invention.

The following example demonstrates the advantages of the illustrated embodiments over conventional LPG methodologies. In this example, the query optimizer may receive a query such as:

Q1: Select * from
    Fact, D1, D2
where
    Fact.D1ID=D1.ID and Fact.D2ID=D2.ID and
    D1.flag=y and D2.status=200

Upon receiving this query, the optimizer may not be precisely clear as to whether LPG should be used before processing of the query commences. The optimizer may determine that the cost of generating the predicates and processing Q1 with the predicates is higher than the costs of processing Q1 without the predicates. Thus, the optimizer may commence processing of Q1 without LPG by joining in a left to right manner and probing the Fact table as shown in TABLE I, the D1 table as shown in TABLE II, and the D2 table as shown in TABLE III.

TABLE I

| FACT TABLE | |
| --- | --- |
| D1ID | D2ID |
| 1 | a |
| 1 | b |
| 2 | c |
| 2 | d |
| 3 | e |
| 3 | f |
| 4 | g |
| 4 | h |
| 5 | i |
| 5 | j |
| 6 | a |
| 6 | b |
| 7 | c |
| 7 | d |
| 8 | e |
| 8 | f |
| 9 | g |

TABLE I-continued

FACT TABLE

| D1ID | D2ID |
|---|---|
| 9 | h |
| 10 | i |
| 10 | j |

TABLE II

D1 TABLE

| ID | flag |
|---|---|
| 1 | y |
| 2 | y |
| 3 | y |
| 4 | y |
| 5 | y |
| 6 | n |
| 7 | n |
| 8 | n |
| 9 | n |
| 10 | n |

TABLE III

D2 TABLE

| ID | status |
|---|---|
| a | 100 |
| b | 100 |
| c | 100 |
| d | 200 |
| e | 200 |
| f | 200 |
| g | 300 |
| h | 300 |
| i | 300 |
| j | 500 |

By not using LPG, there may be twenty sequential probes into the Fact table and twenty probes into the D1 table, with ten probes finding a match on D1's selection. Furthermore, the ten values may be used to probe the D2 table. Thus, without LPG, fifty probes may be required to return the three records that met the parameters of Q1 as shown in TABLE IV.

TABLE IV

RESULT

| Fact.D1ID | Fact.D2ID |
|---|---|
| 2 | d |
| 3 | e |
| 3 | f |

However, instead of incurring the cost of the fifty probes, LPG predicates may be dynamically generated after processing of Q1 has begun with the illustrated embodiment to reduce the number of probes. Moreover, if the optimizer was not certain if LPG should be clearly used or not before processing a database query, or additional factors relevant the processing of the query arose after processing began, the LPG task may dynamically build predicates and add the predicates to the query. Using the same example, eighteen total probes may have been used to process records (1, a) through (3, f) inclusive from the Fact table by the NON-LPG task. The threshold may have expired due to the eighteen probes. As a result, at least one predicate, Fact.D2ID in ('d','e','f'), may be built and added to Q1. While the predicate is building, the NON-LPG task may continue to process the next record, (4, g), from the Fact table. Once the predicate is done building, it may be added to Q1. Q1 may be internally rewritten as:

Q1: Select * from
  Fact, Dimension1, Dimension2
  where
    Fact.D1ID=D1.ID and Fact.D2ID=D2.ID and
    D1.flag=y and D2.status=200
    and Fact.D2ID in ('d','e','f')

After the predicate has been added to Q1, starting with record (4, h), Q1 may process much faster from that point onwards since most of the remaining records in the Fact table may be discarded if they are not in ('d','e','f'). If Q1, which now includes one predicate, is still not processing fast enough according to some threshold, the LPG task may build another predicate, Fact.D1ID in (1,2,3,4,5), and add it to Q1. Q1 may be internally rewritten as:

Q1: Select * from
  Fact, Dimension1, Dimension2
  where
    Fact.D1ID=D1.ID and Fact.D2ID=D2.ID and
    D1.flag=y and D2.status=200
    and Fact.D2ID in ('d','e','f')
    and Fact.D1ID in (1,2,3,4,5)

The second predicate will additionally enhance the performance of Q1 by discarding additional records not in (1,2,3,4,5). Where the conventional approach required the choice of whether to use LPG or not before processing of the query began, dynamic LPG provides a more flexible and intelligent approach such that the number of probes by conventional techniques, fifty probes, may be reduced after processing of the database query has begun. Therefore, the dynamic use of LPG allows the processing of Q1 to be altered in light of sub-optimal decision-making and additional factors arising after processing of the query has begun, resulting in a reduced number of probes and improved query performance.

Various additional modifications may be made to the illustrated embodiments without departing from the spirit and scope of the invention. Therefore, the invention lies in the claims hereinafter appended.

What is claimed is:

1. A method of processing a database query, the method comprising:
  retrieving a cached access plan for the database query, the access plan including look ahead predicate generation information; and
  determining whether to perform look ahead predicate generation for the database query based upon the look ahead predicate generation information in the access plan.

2. The method of claim 1, wherein the look ahead predicate generation information includes at least one of an indication that look ahead predicate generation should be performed, an indication that look ahead predicate generation should not be performed, an indication of whether or not performing look ahead predicate generation for the database query improved the processing time for the database query, a result of the look ahead predicate generation, a predicate, and a threshold.

3. The method of claim 1, further comprising updating the look ahead predicate generation information in the cached access plan based upon at least one change in the way look ahead predicate generation is used to process the database query.

4. The method of claim 1, further comprising performing look ahead predicate generation for the database query in response to determining whether to perform look ahead predicate generation.

5. The method of claim 4, further comprising fetching records from the database for the database query in parallel with performing look ahead predicate generation for the database query.

6. An apparatus, comprising:
   at least one processor;
   a memory; and
   program code resident in the memory and configured to be executed by the at least one processor to process a database query by retrieving a cached access plan for the database query, the access plan including look ahead predicate generation information; and determining whether to perform look ahead predicate generation for the database query based upon the look ahead predicate generation information in the access plan.

7. The apparatus of claim 6, wherein the look ahead predicate generation information includes at least one of an indication that look ahead predicate generation should be performed, an indication that look ahead predicate generation should not be performed, an indication of whether or not performing look ahead predicate generation for the database query improved the processing time for the database query, a result of the look ahead predicate generation, a predicate, and a threshold.

8. The apparatus of claim 6, wherein the program code is configured to update the look ahead predicate generation information in the cached access plan based upon at least one change in the way look ahead predicate generation is used to process the database query.

9. The apparatus of claim 6, wherein the program code is further configured to perform look ahead predicate generation for the database query in response to determining whether to perform look ahead predicate generation.

10. The apparatus of claim 9, wherein the program code is further configured to fetch records from the database for the database query in parallel with performing look ahead predicate generation for the database query.

11. A program product, comprising:
    program code configured to process a database query by retrieving a cached access plan for the database query, the access plan including look ahead predicate generation information; and determining whether to perform look ahead predicate generation for the database query based upon the look ahead predicate generation information in the access plan; and
    a recordable computer readable medium bearing the program code.

12. The apparatus of claim 11, wherein the look ahead predicate generation information includes at least one of an indication that look ahead predicate generation should be performed, an indication that look ahead predicate generation should not be performed, an indication of whether or not performing look ahead predicate generation for the database query improved the processing time for the database query, a result of the look ahead predicate generation, a predicate, and a threshold.

13. The apparatus of claim 11, wherein the program code is configured to update the look ahead predicate generation information in the cached access plan based upon at least one change in the way look ahead predicate generation is used to process the database query.

14. The apparatus of claim 11, wherein the program code is further configured to perform look ahead predicate generation for the database query in response to determining whether to perform look ahead predicate generation.

15. The apparatus of claim 14, wherein the program code is further configured to fetch records from the database for the database query in parallel with performing look ahead predicate generation for the database query.

* * * * *